Nov. 16, 1937.  E. J. WILSON  2,099,044

PROPELLING AND STEERING MECHANISMS FOR TRUCKS AND THE LIKE

Original Filed April 12, 1934  4 Sheets-Sheet 1

INVENTOR.
EMERY J. WILSON.
BY Slough & Canfield
His ATTORNEYS

Nov. 16, 1937. E. J. WILSON 2,099,044
PROPELLING AND STEERING MECHANISMS FOR TRUCKS AND THE LIKE
Original Filed April 12, 1934 4 Sheets-Sheet 2

INVENTOR.
EMERY J. WILSON.
BY
His ATTORNEYs.

Nov. 16, 1937. E. J. WILSON 2,099,044
PROPELLING AND STEERING MECHANISMS FOR TRUCKS AND THE LIKE
Original Filed April 12, 1934 4 Sheets-Sheet 3

INVENTOR.
EMERY J. WILSON
BY
HIS ATTORNEYS

Nov. 16, 1937.  E. J. WILSON  2,099,044
PROPELLING AND STEERING MECHANISMS FOR TRUCKS AND THE LIKE
Original Filed April 12, 1934  4 Sheets-Sheet 4
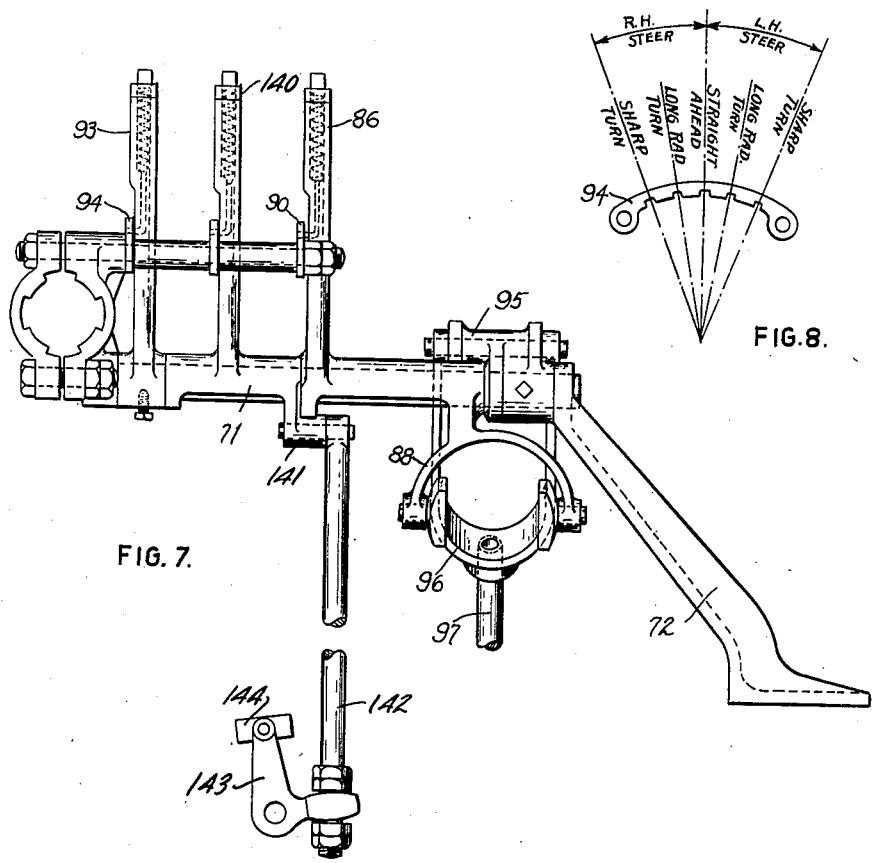
FIG. 7.
FIG. 8.
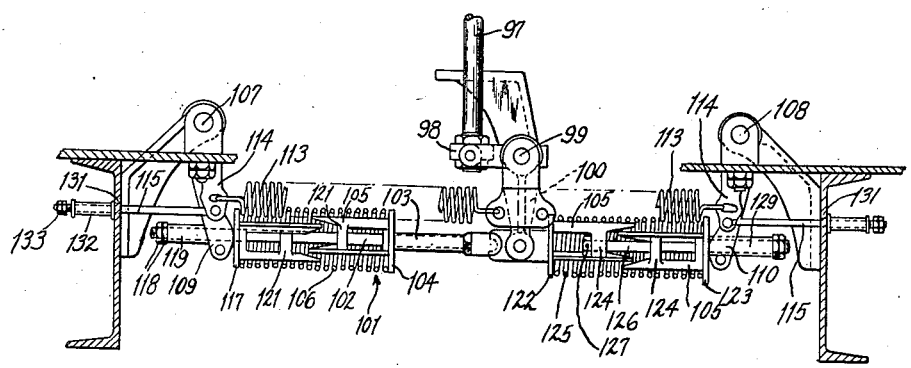
FIG 6.
INVENTOR.
EMERY J. WILSON
BY Stough and Canfield
His ATTORNEYs Patented Nov. 16, 1937

2,099,044

UNITED STATES PATENT OFFICE 2,099,044

PROPELLING AND STEERING MECHANISMS FOR TRUCKS AND THE LIKE

Emery J. Wilson, Cleveland, Ohio, assignor to Thew Shovel Company, Lorain, Ohio, a corporation of Ohio Original application April 12, 1934, Serial No. 720,278. Divided and this application May 8, 1936, Serial No. 78,678

5 Claims. (Cl. 180—9.2)

This invention relates to improvements in propelling mechanisms for trucks, and more particularly relates to travel mechanism for trucks of the endless tread or track laying and locomotive crane types supporting load handling and excavating superstructures.

Trucks of the track laying type or endless tread type, familiarly termed crawlers, are usually propelled from the power unit on the superstructure through the provision of suitable gearing and clutches whereby driving rollers engaging each of the endless treads may be uniformly driven to cause the truck to travel in a straight ahead or reverse direction, or may be selectively disengaged to cause turning of the truck.

The present application is a divisional application from applicant's co-pending application, Serial No. 720,278, filed April 12, 1934 now Patent #2,062,385 issued Dec. 1, 1936, for Propelling mechanism for trucks. The said co-pending application, Serial No. 720,278 is directed to the transmission for an endless tractor permitting steering by driving whereas the present application is directed to the clutch actuating means to effect steering by driving.

I have provided an improved propelling mechanism for trucks of the above type whereby the truck may be driven in a straight ahead or reverse direction and at two different speeds.

It is an object of my invention, therefore, to provide an improved propelling mechanism for trucks of the above type.

Another object of my invention is to provide an improved propelling mechanism for trucks of the above type whereby the truck may be efficiently propelled at two different speeds from a constant speed power unit.

Another object of my invention is to provide an improved propelling mechanism for load handling and excavating machines mounted upon a truck and provided with a single source of power.

Another object of my invention is to provide an improved travel mechanism whereby power may be delivered to a truck drive shaft to cause it to rotate in either direction and at two different speeds from a power unit disposed on a superstructure rotatable upon the truck.

Another object of my invention is to provide an improved propelling and steering mechanism for trucks of the power-steered type whereby the truck may be caused to turn on a relatively short or long radius and at two different speeds for each said radius turns.

Another object of my invention is to provide an improved propelling and steering mechanism for trucks whereby the truck may be caused to turn when traveling in a straight-ahead or reverse direction at two different speeds.

Another object of my invention is to provide an improved control mechanism for trucks of the power-steered type whereby the truck may be caused to turn in either direction from the direction of travel and on a relatively short or long radius turn through manipulation of a single lever.

These and other objects of the invention will become increasingly apparent from a consideration of the following description and drawings wherein:

Fig. 6 is a fragmentary sectional view taken along line 6—6 of Fig. 4;

Fig. 7 is an elevational view of manual control levers which I may employ;

Fig. 8 is a view partially diagrammatic of a quadrant adapted to maintain one of the levers illustrated in Fig. 7 in a plurality of operative positions;

Figure 1:
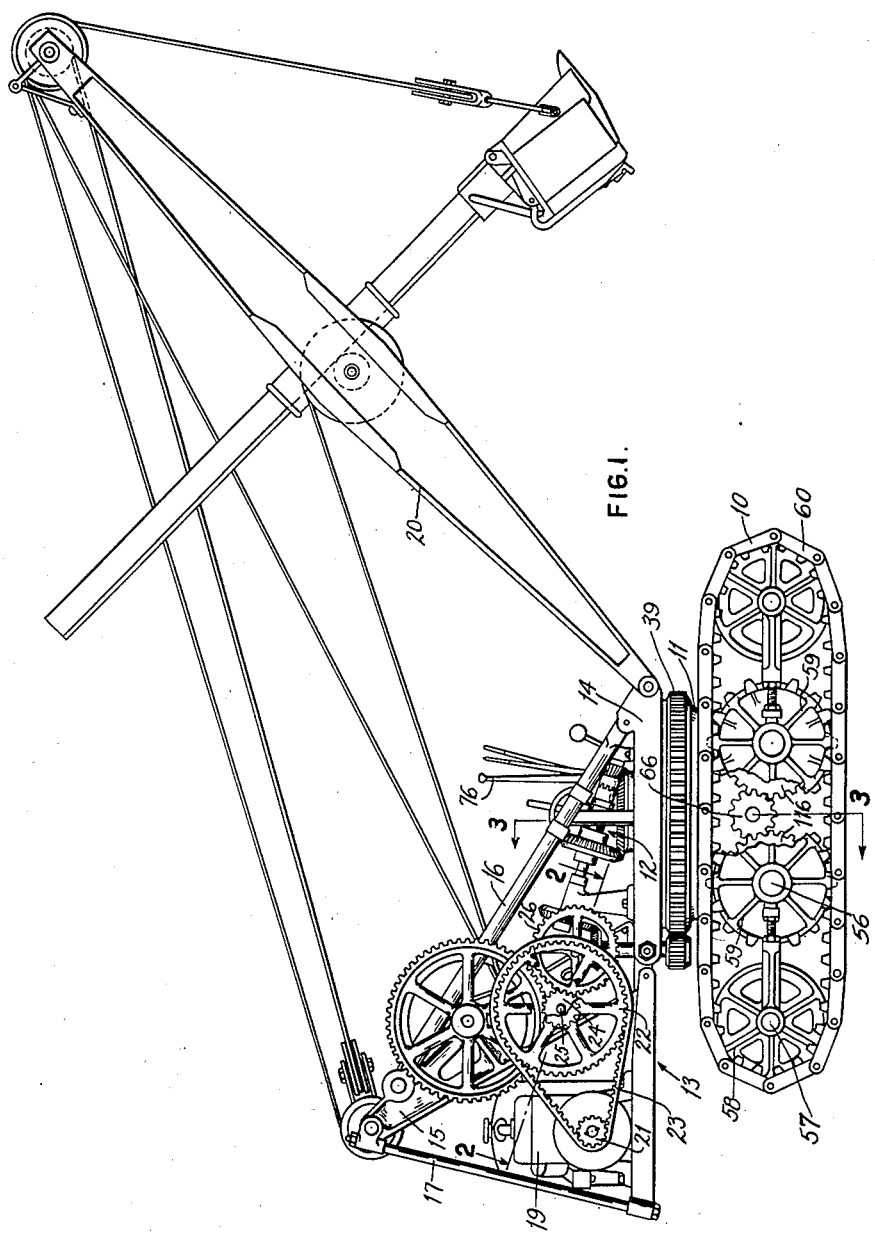
Fig. 1 is an elevational view of a power shovel embodying my invention, with some of the parts removed for simplicity of illustration.
Figure 2:
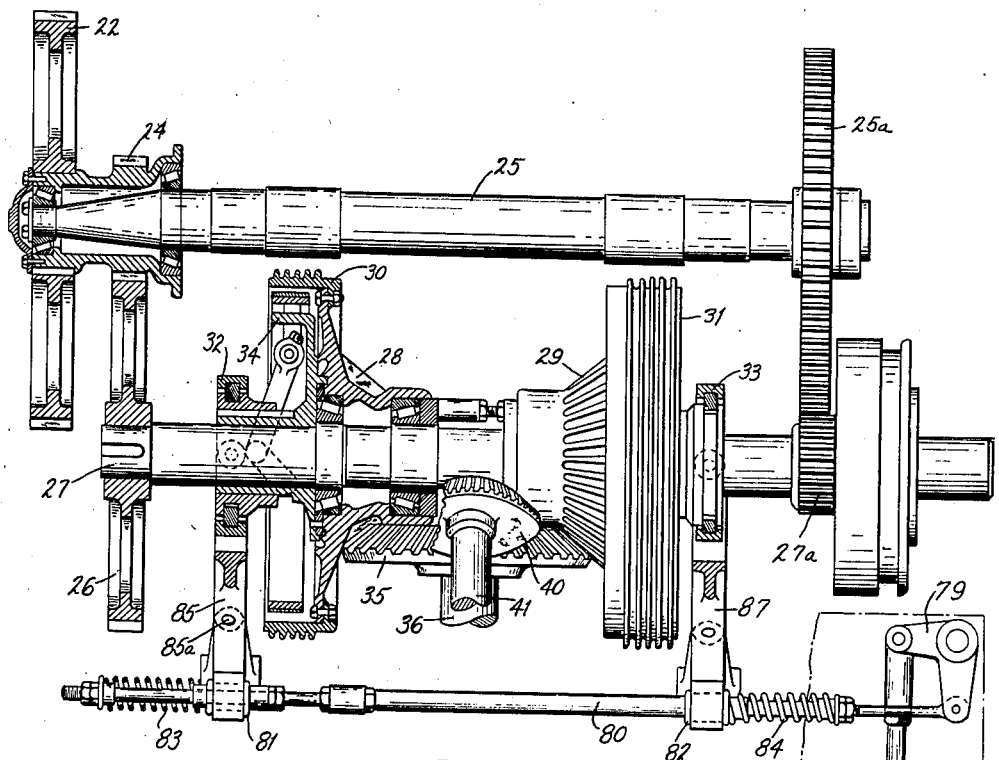
Fig. 2 is an enlarged fragmentary view of a portion of the power shaft mechanism taken on line 2—2 of Fig. 1.

Referring to the drawings, I have indicated the truck generally at 10, the superstructure rotatably supported upon the truck at 11, and the travel mechanism at 12. The superstructure comprises generally a frame 13 including a sectional turntable 14, rearwardly inclined posts 15 pin-connected at their bases to the turntable and supportingly linked with the turntable at their upper ends by struts 16 and tie rods 17; power shafts supported by the posts, a power unit 19 supported rearwardly of the turntable and a boom 20 carried by the turntable. Although I have shown the superstructure as adapted to power shovel operations, it is understood that differing superstructures adapted to various functions may be utilized.

The power unit 19, illustrated as an internal combustion engine, drives a pinion 21 through suitable clutch means, the pinion 21 driving a gear 22 by means of a silent chain 23. The gear 22 together with a pinion 24 integral therewith is rotatably mounted on a center drive shaft 25 preferably by antifriction bearings, the shaft 25 being fixedly mounted between the spaced posts 15, by means not shown but well known in the art. The pinion 24 meshes with a gear 26 keyed to a horizontal swing shaft 27, the swing shaft being rotatably mounted transversely of posts 15 by suitably bushed split bearings provided therein but not shown, being of well known construction. The swing shaft 27 will thus be continuously rotated during operation of the motor. The horizontal swing shaft 27 has rotatably mounted thereon adjustably spaced pinions 28 and 29, each of the pinions having integral therewith a clutch drum as indicated at 30 and 31 respectively.

A pinion 27a on the shaft 27 drives an idler gear 25a on the shaft 25, and the latter may be used to operate a boom hoist drum, not shown, but these parts constitute no essential part of the present invention.

Also mounted on the shaft 27 and splined therewith are grooved sleeves 32 and 33 each operably connected to an internally expanding type friction clutch 34—34 adapted to frictionally engage the inner face of clutch drums 30 and 31 by axial movement of the sleeves 32 and 33. The movement of the sleeves 32 and 33 is manually controlled in a manner to be later described, whereby the pinions 28 and 29 may be selectively coupled to and caused to rotate with the shaft 27.

The pinions 28 and 29 are each meshed with a bevel gear 35 coupled to a vertical swing shaft 36 rotatably supported by the frame 13. The horizontal swing shaft 27 continuously rotates in a clockwise direction as viewed in Fig. 1, and the pinions 28 and 29, being confrontingly mounted on the shaft 27, will cause the bevel gear 35 to be rotated in reverse directions about a vertical axis dependent on which pinion is selectively coupled to the shaft 27.

The bevel gear 35 performs the dual function of operating the vertical swing shaft 36 to swing the superstructure relative to the truck and of operating the travel mechanism in a manner to be described to propel the truck. The shaft 36 by means of a jaw clutch 37 is rotatably coupled with a pinion 38 meshing with and having planetary action relative to a gear 39 fixed to the truck whereby the superstructure may be swung in either direction dependent upon the direction of rotation of the bevel gear 36 as effected by the pinion 28 or 29.

The bevel gear 35 also meshes with a bevel pinion 40 keyed to one end of an inclined travel shaft 41 rotatably mounted on the turntable by means of spaced bearings as indicated at 42 and 43. The direction of rotation of the travel shaft 41 will be determined by selectively coupling the pinion 28 or 29 with the horizontal swing shaft.

Loosely mounted on the travel shaft 41 are spaced bevel pinions 44 and 45 each of said pinions being provided with clutch segments in confronting faces thereof, whereby they may be selectively coupled to the travel shaft by means of an intermediately disposed jaw clutch member 46 splined to the travel shaft. The jaw clutch member 46, adapted to be engaged or disengaged from the aforementioned pinions by movement axially on the travel shaft, is manually controlled through lever means to be described.

The travel shaft pinions 44 and 45 are each meshed with a vertically mounted bevel gear 47, the gear 47 being mounted on a center pin 48 about which the turntable and superstructure rotate. The gear 47 can be caused to rotate in either direction dependent upon the direction of rotation of the travel shaft 41 and at either of two different speeds dependent upon whether pinion 44 or pinion 45 is driving the gear. It will be apparent by reference to Fig. 3 that when the travel shaft 41 is rotating in a given direction, engagement of the gear 47 with the pinion 44 will cause the gear 47 to rotate in one direction, and engagement of the gear 47 with the pinion 45 will cause the gear 47 to rotate in a reverse direction, so that when it is desired to continue traveling in a given direction and at a different speed and when one of the pinions 44 or 45 is rendered inoperable to drive the gear 47 and the other is rendered operable, that the shaft 41 will be reversed in direction by the friction clutches 34 on the horizontal swing shaft.

Thus, with the aforementioned clutch and gear train initiated at the motor, power is transmitted to the gear 47, the friction clutches 34 on the horizontal swing shaft 27 being selectively operable to determine the direction of rotation, and the jaw clutch on the travel shaft being selectively movable to determine the speed of rotation.

The aforementioned gear and clutch train affords a relatively direct, efficient, and compact means of transmitting power to the travel mechanism. This is effected independently of the boom control, hoist, dipper stick, or similar control operations and these operations, if desired, may be carried on concurrently with truck travel. Since the same bevel gear 35 controls the travel mechanism and the swing mechanism, the swing mechanism is normally disengaged during travel, there being no occasion for concurrently effecting travel and swing movements.

The center pin 48 upon which the bevel gear 47 is mounted is rotatably supported generally centrally of the truck body, in a hub 50 integral therewith, the lower end of the center pin having integrally formed therewith a bevel pinion 51 meshing with a gear 61 adapted to be coupled to the crawler drive shafts.

The truck body generally indicated at 55, and preferably formed of cast metal, is of rugged inverted box form construction and is rigidly connected by channel or the like frame members to fixed end axles 57, and intermediately disposed driving axles 56, the axles 57 forming a mounting for idling rollers 58. Driving rollers 59 are rotatably mounted relative to the frame 55 and are adapted to be driven by the axles 56 in a manner to be later described. The rollers 58 and 59 are engageable with and rotate upon an endless tread 60 whereby the truck will be propelled in a manner well understood.

The bevel pinion 51 of the center drive pin 48 meshes with a bevel gear 61 integrally mounted upon a hollow shaft 62 rotatably mounted upon relatively reduced end bearing portions of the driving axles 56 projected into the shaft ends, the driving axles 56 being suitably mounted as previously described by frame members secured to the truck body. The shaft 62 at each end is provided with relatively enlarged outwardly disposed clutch faces 63 engageable with axially movable jaw clutch members 64—64 splined to the driving axles, whereby the driving axles may be independently or concurrently rotated by the gear 61. The jaw clutch members 64 are also adapted to be locked with clutch faces 65 secured to the truck frame members, whereby either driving axle may be selectively locked against rotative movement.

Normally, both driving axles will be coupled with the shaft 62 to propel the truck in a straight ahead position. When it is desired to turn the truck one of the driving axles will be disengaged, whereby one tread will be propelled and the other may be idly moved to effect a relatively long radius turn. To effect a short turn, the disengaged axle, rather than being permitted to idle, is locked to the truck frame by means of the clutch face 65 preventing movement of its associated tread.

There are two central tread driving rollers 59 on each side of the truck, each being provided with an integral gear portion 116 meshed with an intermediate pinion 66. The rollers 59, as previously stated, are engageable with the endless tread 60 through interengaging tooth and sprocket portions. The pinions 66 are fixed to the outer ends of the axles 56 and are rotatable therewith, the axles 56, by means of the jaw clutch members 64—64 splined thereon, being adapted to be selectively engaged either with the clutch face 63 or the clutch face 65 which is fixed to the truck frame. Since the clutch face 65 is fixed to the truck frame, interengagement of the member 64 therewith will prevent the axle 56 and its associated pinion 66 from rotating, and consequently the gear portion 116 integral with the roller 59 will be prevented from rotating, thereby maintaining the endless tread 60 in a fixed position relative to the truck frame.

Thus, when one of the endless treads 60 is maintained fixed by the coupling member 64 and the clutch face 65, and the opposite tread is driven through coupling clutch member 64 and the clutch face 63 of the shaft 62, the truck will be turned relatively more sharply than if the jaw clutch member 64 were in an intermediate position permitting the locked tread to rotate idly without being driven.

The various clutches so far described and whether of the friction or jaw clutch type are operable in a generally similar manner by movement of a grooved sleeve axially of the shaft on which its associated clutch is mounted, the sleeve movement being effected by manually operable levers and suitable link connections. These various lever mechanisms will now be described.

The various operating levers are mounted so as to be easily accessible to the operator, the levers controlling the swinging of the superstructure, derricking of the boom, and the drum hoist being preferably mounted on a common shaft 70 secured to a plate 70a supported laterally of the turntable as is also the lever controlling the engine clutch. The levers controlling the steering, travel, and a lever controlling the swinging of the superstructure being mounted on a common shaft 71, the shaft 71 being spaced upwardly from the turntable by a bracket 72 and a collar engaging the strut 16. The levers controlling derricking of the boom, the hoist drum, and kindred operations, constitute no essential part of my present invention and can be of any suitable type well understood in the art.

Figure 9:
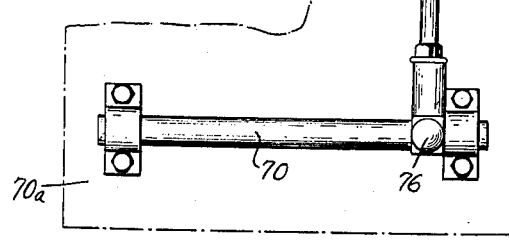
Fig. 9 is a fragmentary elevational view showing the method of mounting the manual control lever of Fig. 2.
Figure 9:
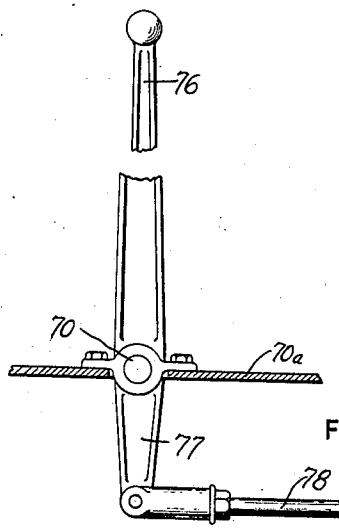
Figures 4, 5:
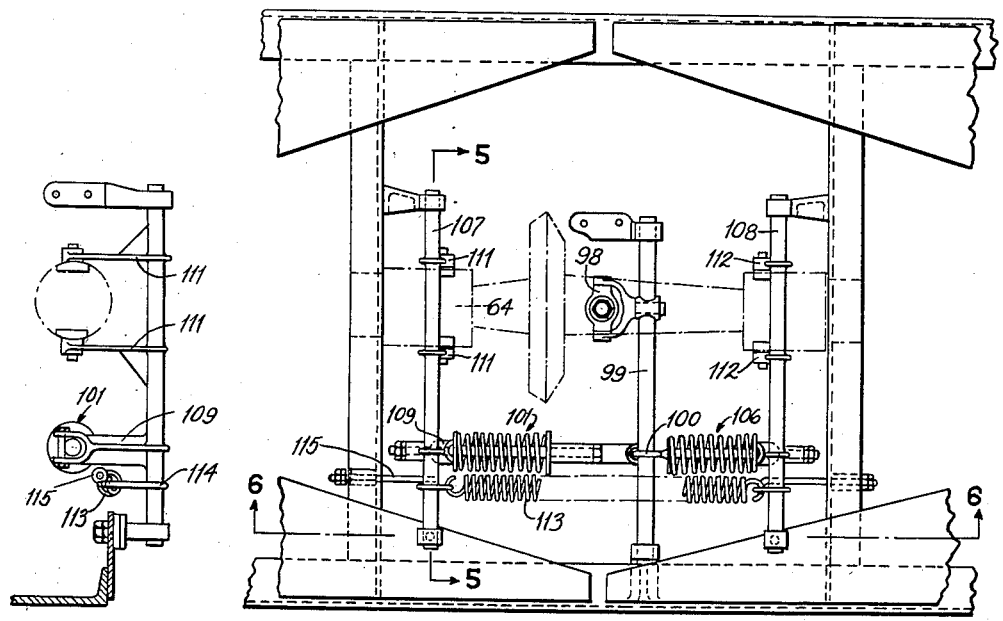
Fig. 4 is a plan view partially diagrammatic taken along line 4—4 of Fig. 3, illustrating the clutch actuating mechanism.
Fig. 5 is a transverse sectional view taken on line 5—5 of Fig. 4.

The swing lever 76 which actuates the sleeves 32 and 33 axially of the horizontal swing shaft to selectively couple the pinions 28 and 29 therewith through friction clutches 34, is rotatably mounted on the shaft 70 and is provided with a depending arm 77. As best illustrated in Fig. 9, the arm 77 is linked by a connection 78 to one arm of a pivoted crank 79 supported by the plate 70a, the opposite arm of the crank being adapted to transmit movement horizontally and generally at right angles to the connection 78 to a rod 80. Thus, rotative movement of the swing lever 76 about its shaft will transmit horizontal movement transversely of the turntable to the rod 80 through the aforementioned link means.

Fixedly secured to the rod 80 at spaced points, by means of an intermediately disposed spacing sleeve are fixed collars 81 and 82. Adjacent each of the fixed collars 81 and 82 are resiliently and axially movable cooperating centering springs 83 and 84. The collar 81 and spring 83 have disposed therebetween the forked lower end of a yoke member 85 which partially encircles the rod 80. Substantially midway of the yoke member 85 it is provided with a pivotal support 85a secured to the turntable, the upper or yoke end being provided with pins directed inwardly towards and radially of the horizontal swing shaft 27. The yoke pins engage the sleeve 32 and effect axial movement of the sleeve to engage or disengage the pinion 28 from the shaft 27. Thus, upon movement of the fixed collar 81 outwardly relative to the turntable through the link means described, the pinion 28 will be coupled to the shaft. In like manner, a yoke member 87 controls the engagement and disengagement of the pinion 29 with the shaft 27 through actuation of the fixed collar 82.

Movement of the lever 76 upon either side of a neutral position will selectively couple the pinions 28 and 29 with the shaft 27 and upon release of the lever it will be returned to the neutral or disengaged position relative to both pinions, by means of the resiliently movable centering springs 83 and 84. Thus, to effect swinging of the superstructure or to propel the truck, the gear 35 will be caused to rotate in a desired direction by the above described lever means. The swinging of the superstructure will be effected first by selectively coupling gear 35 with pinion 28 or 29 to selectively rotate gear 35 in reverse directions. This is accomplished by manipulation of lever 76 as just described. Secondly, jaw clutch element 37 must be operably connected with shaft 36 and its associated pinion 38. As previously described, pinion 38 upon being rotated will have planetary action relative to the truck due to its engagement with gear 39 fixed to the truck and thereby rotate the superstructure about the truck. The actuation of jaw clutch element 37 is controlled by a lever 141 in a manner hereinafter described. Thus, both lever 76 mounted on shaft 70 and lever 141 mounted on shaft 71 must be manipulated to effect swinging of the superstructure in a desired direction.

The lever means actuating the jaw clutch member 46 mounted on the travel shaft to selectively couple the bevel pinions 44 or 45 with the shaft will now be described. The hand operable control lever effecting this result is termed the travel lever, indicated at 86, rotatably mounted on the shaft 71 and provided with a laterally extending sleeve telescoped over the shaft. The sleeve has integral therewith a forked arm 88 extending radially from the shaft 71 and engageable by inwardly disposed pins at the fork ends with the jaw clutch element 46. Pivotal movement of the lever 86 about the shaft 71 in one direction will cause the jaw clutch element 46 to engage the pinion 44, thereby coupling the pinion to the travel shaft, whereby the truck may be propelled at a given speed; movement of the lever 86 in a reverse direction will couple the pinion 45 with the travel shaft to propel the truck at a different speed, and in an intermediate or neutral position of the lever 86 neither pinion will be coupled to the travel shaft. To maintain the lever in a desired position, it is provided with a spring operable detent adapted to lock with a quadrant 90.

The swing lever 76 will, in a manner previously described, effect the direction of rotation of the travel shaft and the travel lever 86 will effect the speed at which the truck is propelled, as hereinbefore more fully described.

The manner of effecting steering of the truck will now be described. A steering lever 93 rotatably fixed to the shaft 71, upon which the travel lever 86 is also mounted, is adapted by means of a detent engageable with a quadrant 94 to be locked in a desired position in a manner similar to the lever 86. Movement of the lever 93 will rock the shaft 71 and a laterally extending crank 95 rigidly secured thereto, the crank 95 being pivotally connected intermediate the arms of a yoke member 96, whereby a vertical movement will be transmitted to the yoke 96 by rotative movement of the steering lever 93. The yoke 96 is adjustably secured to a rod 97 projected through and movable axially of the vertically disposed center pin 48, the lower end of the rod 97 being connected to a trunnion block 98 disposed laterally of and adapted to rock a shaft 99 rotatably mounted generally centrally and longitudinally of the truck. A depending arm 100, rigidly secured to the shaft 99 and bifurcated at its lower end, is pin connected to a clutch actuating mechanism 101 by which rock shafts 107 and 108 supported in bearings on the main frame or superstructure are oscillated to reciprocably operate the clutches 64—64 by means of depending pairs of arms 111—111 and 112—112 engaged at their lower ends by pins in the above-referred to grooves in the clutches.

The rock shafts 107 and 108 have depending therefrom, respectively, arms 109 and 110 by which rocking movement is communicated to the rock shaft from the said depending arm 100 upon oscillation of the shaft 99 above referred to, by the following means.

A rod 102 pivotally connected to the lower end of the arm 100 has a sleeve spacer 103 thereon abutting upon a circular head 104 of a spring support comprising arms 105 telescoped within a compression spring 106, the rod 102 passing through the head 104 and axially through the spring 106 and through a similar circular head 117 having arms 105 thereon within the spring, the rod outwardly of the head 117 having nuts 118 thereon and having a spacing sleeve 119 between the nuts and the head 117. The heads 104 and 117 together with the arms 105 maintain the spring 106 in axial alignment with the rod 102 and it is put under initial compression by the nuts 118. The lower end of the arm 109 is forked and straddles the sleeve 119 and a pin bridging the fork and under the sleeve 119 slidably supports the outer end of the rod 102 and the parts thereon including the spring 106.

The arms 105 within the spring 106 may be connected by tie members 121—121 and the rod 102 may have bearings therein to further assist in supporting the spring. At the other side of the arm 100 is a circular head 122 pivotally connected to the lower end of the arm 100 and opposite thereto is a head 123, the head having arms 105 thereon connected by tie members 124—124 within a spring 125, the spring abutting the two heads. A rod 126 has bearing in the tie members 124 and has a nut 127 abutting one bridge member on one end of the rod, the other end of the rod projecting through the head 123 and having nuts thereon, a sleeve 129 abutting upon the nut ends and upon the head 123. The depending arm 110 at its lower end is forked straddling the sleeve 129 and a pin connecting the forks and under the sleeve 129 supports the rod 126 and the spring and other parts thereon.

The lower end of the arm 109 has a rounded portion engaging the head 117 and the corresponding lower end of the arm 110 has a like rounded portion engaging the head 123, and the arms 109 and 110 are held in engagement with the said head by a tension spring 113 hooked at opposite ends into the ends of depending arms 114—114 secured to the rock shafts 107 and 108 to which the arms 109 and 110 are secured. All movement under the force of the tension spring 113 is limited by the clutches 64 seating in clutch faces 63. Rods 115 are projected through perforations at 131—131 in the main frame, and outwardly thereof carrying sleeves 132 and 133. The rods 115 are used only to hold the clutches permanently disengaged when towing the machine.

By means of the mechanism above described, the arms 111—111 and 112—112 are held by the spring 113 in the position to normally engage the clutches 64—64 with the clutch faces 63—63 of the shaft 62, whereby the shaft 62 is normally connected to the driving shafts 56—56 and the driving rollers 59 are normally both coupled with the shafts 56—56 through the pinions 66 on the shafts meshed with the gears 116—116. This normal position of parts corresponds to the middle position of the lever 93 in Fig. 8.

Figure 3:
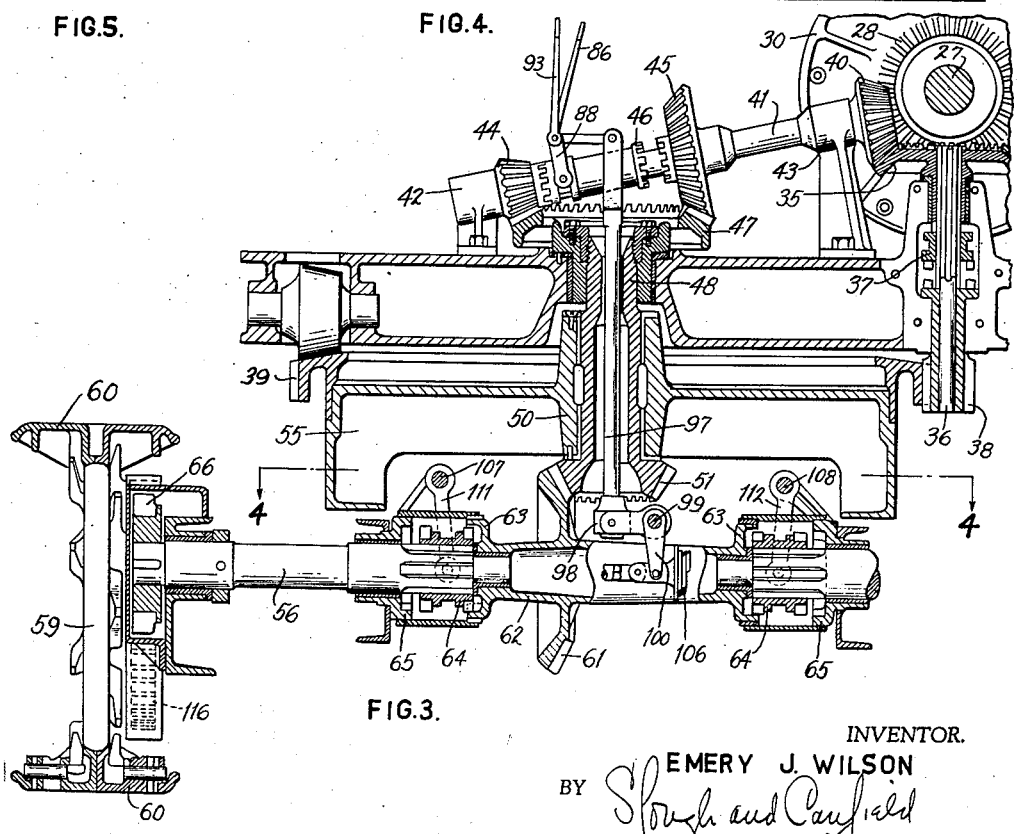
Fig. 3 is a transverse vertical sectional view of the truck, taken along the lines 3—3 of Fig. 1, and of the superstructure rotated through 90° as illustrated in Fig. 1.

If now the vertical rod 97 is moved downwardly by means of the steering lever 93, it will move the arm 100 to the right as viewed in Fig. 6 and compress the spring 125 and through the arm 110 will rock the shaft 108, moving the corresponding clutch element 64 to the right as viewed in Fig. 3 causing it to uncouple its associated shaft 56 from the power shaft 62; and if the lever 93 is stopped in the next to the middle notch, Fig. 8, the clutch 64 will be in an intermediate or neutral position and not connected to either the shaft 62 or the stationary frame. One tread therefore will not be driven, its driving rollers rotating idly, and the other tread will be driven by its rollers and the truck will therefore be caused to turn on a relatively large radius. If the lever 93 is, however, moved farther or to the outer notch position, the vertical rod 97 will be moved downwardly farther and will rock the shaft 108 sufficiently to engage the clutch with its associated clutch face 65 secured to the frame. The corresponding driving rollers will be locked against rotative movement which will hold their engaged tread stationary and cause the truck to turn on a relatively short radius. Upon release of the steering lever 93 and its return to normal or central position, the clutch element 64 will again be moved by the spring 113 to couple the corresponding shaft 56 with the drive shaft 62 and the truck will be propelled again straight ahead. Upward movement of the rod 97 by the lever 93 will in a similar manner cause the truck to be turned in the reverse direction on either a long or a short radius in a manner similar to that described above. Thus, upward movement of rod 97 causes arm 100 to be rocked in a clockwise direction and force spacer sleeve 103 to the left as viewed in Fig. 6 and thereby compress spring 106 to rock arm 109 and shaft 107 in a clockwise direction. This will effect disengagement of the left hand clutch element 64 from the shaft 63, and with continued movement the clutch element will be locked with the truck frame.

In Fig. 8 is illustrated the hand lever 93 adapted to be locked in five different positions whereby, as will now be clear, at the central position the truck will travel in a straight-ahead direction and at the positions at either side of center it will be caused to turn to the left or right on a long radius and at the extreme outer positions the truck will be caused to turn on a short radius.

As stated above, both clutches 64 are always constrained to move toward the straight-ahead position, Fig. 3, by the spring 113, and either clutch when moved to the disengaged or extreme engaged position is under the tension of the spring 113 tending to return it, and each clutch device is moved away from its normal position against the tension of the spring 113 by the compressive force of the respective springs 106 and 125.

It will be observed that the clutches 34—34 transmitting the propelling power from the horizontal swing shaft 25, are friction clutches; and that the clutches engaging the gears 44 and 45 on the travel shaft 41 as well as the clutches 64—64 are jaw type positive clutches, but that the clutches 64—64 are resiliently engaged with their corresponding jaw teeth by the spring 113 or the springs 106 and 125. By this means, the operator may move the steering lever 93 directly to the corresponding direction notch and then immediately may use both hands for other purposes. The direction clutches 64—64 may not immediately engage their corresponding teeth because they do not register therewith or because they are held in their previously engaged position by the friction of the drive connection therewith, but immediately upon registration or upon a slight change of driving torque which may of itself occur or which may be effected by a momentary release of the clutches 34—34, the clutches will be resiliently moved to their changed position.

The manner of effecting movement of jaw clutch element 37 to couple bevelled pinion 35 with pinion 38 to effect rotation of the turntable will now be described. Referring to Fig. 7, it will be noted that a lever 140 is pivotally mounted on shaft 71 intermediate levers 86 and 93. Movement of lever 140 rocks a crank arm 141 integral therewith to which is secured a generally vertically extending rod 142. The crank portion 141 is generally horizontally extending and the rod 142 is pivotally connected therewith whereby rocking movement of the crank portion 141 will impart a generally vertical movement to rod 142. The rod 142 has a yoke member 143 adjustably fixed to the lower end thereof and pivotally mounted on the yoke arm are shoes 144 adapted to engage an annular groove provided in jaw clutch element 37.

It will now be understood that movement of lever 140 through the transmission means described will cause axial movement of jaw clutch element 37 along the vertical swing shaft 36 to which it is splined to cause engagement or disengagement of the jaw clutch element 37 with the cooperating clutch teeth on pinion 38. Upon engagement of the jaw clutch element 37 with pinion 38 the swing lever 76 will be operated in a manner previously described to cause rotation of the vertical swing shaft 36 in a desired direction dependent upon the direction in which it is desired to rotate the turntable.

The above described steering and travel control mechanism permits steering and travel to be effected from any relatively rotated position of the superstructure.

Although I have shown and described a preferred embodiment of my invention, I contemplate that numerous and extensive departures therefrom may be made without departing from the spirit of my invention and within the scope of the appended claims.

I claim:

1. In a vehicle of the class described, a power delivery shaft, a pair of propelling shafts axially aligned with the power shaft, a pair of clutches each including a slideable clutch element adapted in a first position to rotatably interlock its associated propelling shaft and power delivery shaft and in a second position to disengage said shafts, a pair of rock shafts each adapted to effect movement of a slideable clutch element, a manually operable lever having a central position and lateral positions on either side thereof, a pair of link means each connecting a rock shaft and the lever, each link means including a spring compressible by lever movement from a central to a lateral position to effect disengagement of its associated propelling shaft from the power delivery shaft, tension means interconnecting each rock shaft and lever opposing spring compressing force on the rock shaft to effect engagement of the disengaged propelling shaft with the power delivery shaft upon return of the lever to the central position.

2. In a vehicle of the class described including a truck frame, a power delivery shaft supported by the frame, a pair of propelling shafts supported by the frame and axially aligned with the delivery shaft, a pair of clutches each including a slideable clutch element adapted in one position to rotatably interlock its associated propelling shaft and the power delivery shaft and in another position to lock said propelling shaft with the truck frame, a pair of rock shafts each adapted to effect movement of a slideable clutch element, a manually operable lever, link means interconnecting the lever with each of the rock shafts including a set of springs compressible by lever movement in a given direction to effect disengagement of a clutch connecting the propelling shaft with the power delivery shaft and upon continuous lever movement in the same direction to effect locking of said propelling shaft with a portion of the truck frame, tension means interconnecting each rock shaft with the lever opposing said compressing movement and adapted upon lever movement in a reverse direction to effect disengagement of the locked propelling shaft from the truck frame and upon continued movement in said reverse direction to effect engagement of said propelling shaft with the power delivery shaft.

3. A vehicle of the class described comprising a power delivery shaft, a pair of propelling shafts axially aligned therewith, a pair of slideable clutch elements each adapted to engage and disengage the propelling shaft with the power delivery shaft, clutch actuating means comprising a pair of rock shafts each connected with a slideable clutch element and each rockable in reverse directions to move its associated clutch element to engaged and disengaged position, a manually operable lever movable to a plurality of positions including a central position, spring means interposed between the lever and each rock shaft compressible by lever movement from the central position in a given direction to rock its associated rock shaft and clutch element from an engaged to a disengaged position independently of movement of the other rock shaft, tension means interconnecting the rock shafts and the lever opposing movement of a rock shaft to a clutch disengaged position and effecting reverse movement of a rock shaft upon returning the lever to a central position from a clutch disengaged position.

4. A vehicle of the class described comprising a truck frame, a power delivery shaft, a propelling shaft, a slideable clutch element adapted in a first position to rotatably interlock the propelling shaft and power delivery shaft, in a second position to disengage said shafts, and in a third position to lock the propelling shaft to the truck frame, clutch actuating means comprising a rock shaft, a manually operable lever movable to a plurality of positions, spring means interposed between the rock shaft and the lever compressible by lever movement from the first and second positions to move the rock shaft and clutch element to disengage the power shaft and propelling shaft, the spring means being further compressible by lever movement to the third position to further move the rock shaft and clutch element in the same direction to lock the propelling shaft to the truck frame, tension means connecting the rock shaft and lever tending to move the rock shaft in reverse direction and effecting disengagement of the propelling shaft and truck frame upon reverse lever movement from a third to a second position, and effecting re-engagement of the power delivery shaft and propelling shaft upon continued reverse lever movement from the second to first position.

5. A vehicle as described in claim 4 and wherein a pair of propelling shafts are provided each operable through its associated rock shaft, spring means, and tension means through lever movement in a similar manner, and lever movement disengaging one of the propelling shafts from the power delivery shaft and locking said shaft to the truck frame increasing the tension on the rock shaft associated with the other propelling shaft and decreasing the force of the spring means thereon to maintain said other propelling shaft engaged with the power delivery shaft.

EMERY J. WILSON.